(12) United States Patent
Wu (10) Patent No.: US 12,506,564 B2
(45) Date of Patent: Dec. 23, 2025

(54) RANDOM ACCESS METHOD AND TERMINAL

(71) Applicant: VIVO MOBILE COMMUNICATION CO., LTD., Guangdong (CN)

(72) Inventor: Yumin Wu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 693 days.

(21) Appl. No.: 17/199,118

(22) Filed: Mar. 11, 2021

(65) Prior Publication Data

US 2021/0204329 A1    Jul. 1, 2021

Related U.S. Application Data

(63) Continuation of application No. PCT/CN2019/098175, filed on Jul. 29, 2019.

(30) Foreign Application Priority Data

Sep. 18, 2018 (CN) .......................... 201811089695.X (51) Int. Cl.
*H04W 74/0833* (2024.01)
*H04L 1/1812* (2023.01)
(Continued)

(52) U.S. Cl.
CPC .......... *H04L 1/1819* (2013.01); *H04L 1/1874* (2013.01); *H04W 74/002* (2013.01);
(Continued)

(58) Field of Classification Search
CPC ......... H04W 74/0833; H04W 74/0836; H04W 74/0838; H04W 28/0278; H04L 1/1819; H04L 1/1835; H04L 1/1822; H04L 1/1874

See application file for complete search history.

(56) References Cited

U.S. PATENT DOCUMENTS

2009/0186624 A1    7/2009  Cave et al.
2009/0232076 A1    9/2009  Kuo
(Continued)

FOREIGN PATENT DOCUMENTS

CN    101534565 A    9/2009
CN    102047586 A    5/2011
(Continued)

OTHER PUBLICATIONS

JP Office Action in Application No. 2021-514349 dated Apr. 18, 2022.
(Continued)

*Primary Examiner* — Yee F Lam
(74) *Attorney, Agent, or Firm* — BROOKS KUSHMAN P.C.

(57) ABSTRACT

This disclosure provides a random access method and a terminal. The method includes: sending first data in first data content in an $i^{th}$ random access procedure, where the first data content is data content buffered in an $(i-1)^{th}$ random access procedure, at least one of the $i^{th}$ random access procedure and the $(i-1)^{th}$ random access procedure is a two-step random access procedure, and i is an integer greater than 1.

15 Claims, 3 Drawing Sheets

Send first data in first data content in an $i^{th}$ random access procedure, where the first data content is data content buffered in an $(i-1)^{th}$ random access procedure, at least one of the $i^{th}$ random access procedure and the $(i-1)^{th}$ random access procedure is a two-step random access procedure, and i is an integer greater than 1 — 301

(51) Int. Cl.
    *H04L 1/1867*     (2023.01)
    *H04W 74/00*     (2009.01)
    *H04W 74/0836*     (2024.01)
    *H04W 74/0838*     (2024.01)

(52) U.S. Cl.
    CPC ... *H04W 74/0833* (2013.01); *H04W 74/0836* (2024.01); *H04W 74/0838* (2024.01)

(56) References Cited

U.S. PATENT DOCUMENTS

| | | |
|---|---|---|
| 2010/0202288 A1 | 8/2010 | Park et al. |
| 2012/0093022 A1 | 4/2012 | Wang |
| 2015/0181406 A1 | 6/2015 | Seo et al. |
| 2015/0215825 A1 | 7/2015 | Kim et al. |
| 2017/0019930 A1 | 1/2017 | Lee et al. |
| 2017/0135101 A1 | 5/2017 | Li et al. |
| 2018/0084407 A1 | 3/2018 | Jung et al. |
| 2018/0103465 A1* | 4/2018 | Agiwal ............... H04W 74/004 |
| 2018/0213572 A1 | 7/2018 | Zhang et al. |
| 2018/0279186 A1* | 9/2018 | Park .................. H04W 36/30 |
| 2019/0320467 A1* | 10/2019 | Freda ................. H04W 74/004 |
| 2019/0350000 A1 | 11/2019 | Zhang et al. |
| 2019/0350004 A1 | 11/2019 | Zhao et al. |
| 2020/0404711 A1 | 12/2020 | Zhao et al. |
| 2021/0153259 A1 | 5/2021 | Wu et al. |

FOREIGN PATENT DOCUMENTS

| | | |
|---|---|---|
| CN | 102333521 A | 1/2012 |
| CN | 104365150 A | 2/2015 |
| CN | 106105366 A | 11/2016 |
| CN | 106385712 A | 2/2017 |
| CN | 107872899 A | 4/2018 |
| CN | 108093451 A | 5/2018 |
| CN | 108271275 A | 7/2018 |
| CN | 108282899 A | 7/2018 |
| JP | 2011509049 A | 3/2011 |
| JP | 2012531137 A | 12/2012 |
| JP | 2017522828 A | 8/2017 |
| SG | 11202100835 | 2/2021 |
| WO | 2018/064367 A1 | 4/2018 |

OTHER PUBLICATIONS

CN Office Action in Application No. 201811089695.X dated Mar. 22, 2021.
"Initial access and mobility for NR unlicensed operation" 3GPP TSG RAN WG1 Meeting #94, R1-1808508, LG Electronics, Aug. 20, 2018.
"2-Step RACH support for Small Cells." 3GPP TSG-RAN WG2 # 100, R2-1712961, Gemalto N.V., Dec. 27, 2017.
Written Opinion and International Search Report in Application No. PCT/CN2019/098175 dated Apr. 1, 2021.
JP Office Action in Application No. 2021-514349 Dated Oct. 24, 2022.
SG Office Action in Application No. 11202102609V Dated Nov. 15, 2022.

* cited by examiner

Send first data in first data content in an $i^{th}$ random access procedure, where the first data content is data content buffered in an $(i-1)^{th}$ random access procedure, at least one of the $i^{th}$ random access procedure and the $(i-1)^{th}$ random access procedure is a two-step random access procedure, and i is an integer greater than 1 — 301

FIG. 3

In a two-step random access procedure, generate third data content in the two-step random access procedure, and buffer the third data content ⎯ 401

RANDOM ACCESS METHOD AND TERMINAL

CROSS-REFERENCE TO RELATED APPLICATIONS

This application is a continuation application of International Application No. PCT/CN2019/098175 filed on Jul. 29, 2019, which claims priority to Chinese application No. 201811089695.X filed in China on Sep. 18, 2018, which is incorporated herein by reference in its entirety.

TECHNICAL FIELD

Embodiments of this disclosure relate to the field of communications technologies, and in particular, to a random access method and a terminal.

BACKGROUND

Currently, a new random access procedure type has been introduced to random access procedures: two-step random access (2-step RACH); and user data may be sent to a network-side device by using a first random access request message.

However, in a scenario in which a random access success rate is low, a terminal needs to continuously initiate random access procedure attempts, and a two-step random access procedure attempt is included in two consecutive random access procedure attempts performed by the terminal, there is no related solution to processing of data between the two consecutive random access procedure attempts.

SUMMARY

This disclosure is implemented as follows:

According to a first aspect, an embodiment of this disclosure provides a random access method, where the method includes:

sending first data in first data content in an $i^{th}$ random access procedure, where the first data content is data content buffered in an $(i-1)^{th}$ random access procedure, at least one of the $i^{th}$ random access procedure and the $(i-1)^{th}$ random access procedure is a two-step random access procedure, and i is an integer greater than 1.

According to a second aspect, an embodiment of this disclosure provides a random access method, where the method includes:

in a two-step random access procedure, generating third data content in the two-step random access procedure, and buffering the third data content.

According to a third aspect, an embodiment of this disclosure further provides a terminal, where the terminal includes:

a first sending module, configured to send first data in first data content in an $i^{th}$ random access procedure, where the first data content is data content buffered in an $(i-1)^{th}$ random access procedure, at least one of the $i^{th}$ random access procedure and the $(i-1)^{th}$ random access procedure is a two-step random access procedure, and i is an integer greater than 1.

According to a fourth aspect, an embodiment of this disclosure further provides a terminal, where the terminal includes:

a buffer module, configured to: in a two-step random access procedure, generate third data content in the two-step random access procedure, and buffer the third data content.

According to a fifth aspect, an embodiment of this disclosure further provides a terminal, where the terminal includes a processor, a memory, and a computer program stored in the memory and capable of running on the processor, and when the computer program is executed by the processor, the steps of the foregoing random access method are implemented.

According to a sixth aspect, an embodiment of this disclosure further provides a computer-readable storage medium, where the computer-readable storage medium stores a computer program, and when the computer program is executed by a processor, the steps of the foregoing random access method are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

The terms "first", "second", and the like in this disclosure are used to distinguish between similar objects instead of describing a specific order or sequence. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device. In addition, the term "and/or" used in this disclosure indicates at least one of connected objects. For example, "A and/or B and/or C" represents the following seven cases: only A, only B, only C, both A and B, both B and C, both A and C, and all A, B, and C.

Figure 1:
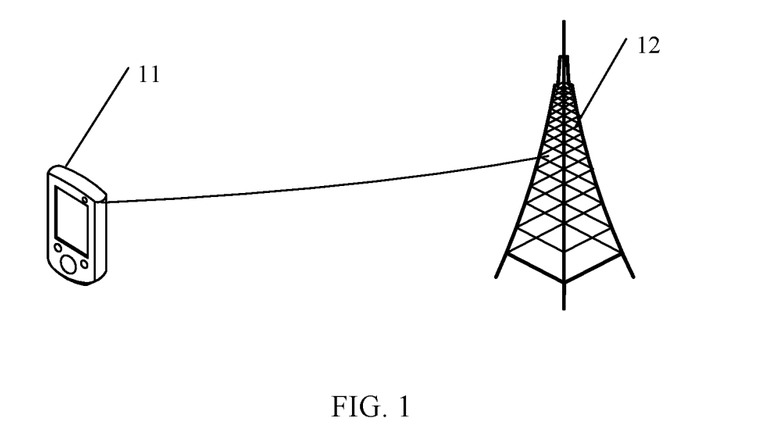
FIG. 1 is a structural diagram of a network system to which embodiments of this disclosure can be applied.

FIG. 1 is a structural diagram of a network system to which embodiments of this disclosure can be applied. As shown in FIG. 1, the network system includes a terminal 11 and a network-side device 12, and communication can be performed between the terminal 11 and the network-side device 12.

In this embodiment of this disclosure, the terminal 11 may also be referred to as UE (User Equipment). In a specific implementation, the terminal 11 may be a terminal-side device such as a mobile phone, a tablet computer (Tablet Personal Computer), a laptop computer, a personal digital assistant (PDA), a mobile Internet device (MID), a wearable device, or a vehicle-mounted device. It should be noted that a specific type of the terminal 11 is not limited in this embodiment of this disclosure.

The network-side device 12 may be a base station, a relay, an access point, or the like. The base station may be a 5G base station or a base station of a later release (for example, a 5G NR NB), or a base station in another communications system (for example, an eNB (evolved NodeB)). It should be noted that a specific type of the network-side device 12 is not limited in this embodiment of this disclosure.

For ease of description, the following describes some content in the embodiments of this disclosure.

1. Conventional Random Access Procedure

A conventional random access procedure may include a contention-based random access procedure and a non-contention based random access procedure. The contention-based random access procedure may be represented as a four-step random access (4-step RACH) procedure.

In the "contention-based random access procedure", UE sends an Msg1 (a random access request message) to a network-side device. After receiving the Msg1, the network-side device sends an Msg2 (RAR (Random Access Response) message) to the UE, where the Msg2 carries uplink grant information. Based on the uplink grant information in the Msg2, the UE performs a MAC (Medium Access Control) layer packet assembly function to generate a MAC PDU (Protocol Data Unit), and stores the MAC PDU in an Msg3 buffer, and then the UE sends the MAC PDU in the Msg3 buffer by using a HARQ process. After receiving the Msg3, the network-side device sends an Msg4 (for example, a contention resolution identity) to the UE. The UE receives the Msg4, and determines whether contention is successfully resolved. If the contention is successfully resolved, the random access procedure succeeds; otherwise, the UE reinitiates a random access procedure.

In the reinitiated random access procedure, after the UE receives uplink grant information in an Msg2 again, the UE may directly obtain the MAC PDU previously stored in the Msg3 buffer, and send the MAC PDU by using a HARQ process. After the random access procedure is complete (for example, the random access procedure succeeds or the random access procedure fails), the UE flushes a HARQ buffer used for Msg3 transmission in the random access procedure.

In the "non-contention based random access procedure", the UE sends an Msg1 to the network-side device. After receiving the Msg1, the network-side device sends an Msg2 to the UE, where the Msg2 carries uplink grant information and identity information of the UE (for example, a number of a random access preamble (preamble) in the Msg1). If the number of the random access preamble is the same as a number of a random access preamble carried in the Msg1 of the UE, the UE considers that the random access procedure succeeds; otherwise, the UE reinitiates a random access procedure.

Every time the UE initiates (or reinitiates) a random access procedure, the UE selects a random access resource based on downlink signal quality (for example, RSRP (Reference Signal Received Powerr) of an SSB (Synchronization signal block)) corresponding to an Msg1 resource in each random access procedure, to increase a random access success rate. Therefore, every time the UE initiates (or reinitiates) a random access procedure, the UE may select the "contention-based random access procedure" or the "non-contention based random access procedure". On the other hand, when the UE reinitiates an $i^{th}$ random access procedure, a type of the $i^{th}$ random access procedure may be the same as a type of an $(i-1)^{th}$ random access procedure, or may change, where i is an integer greater than 1.

2. Two-Step Random Access (2-Step RACH) Procedure

Figure 2:
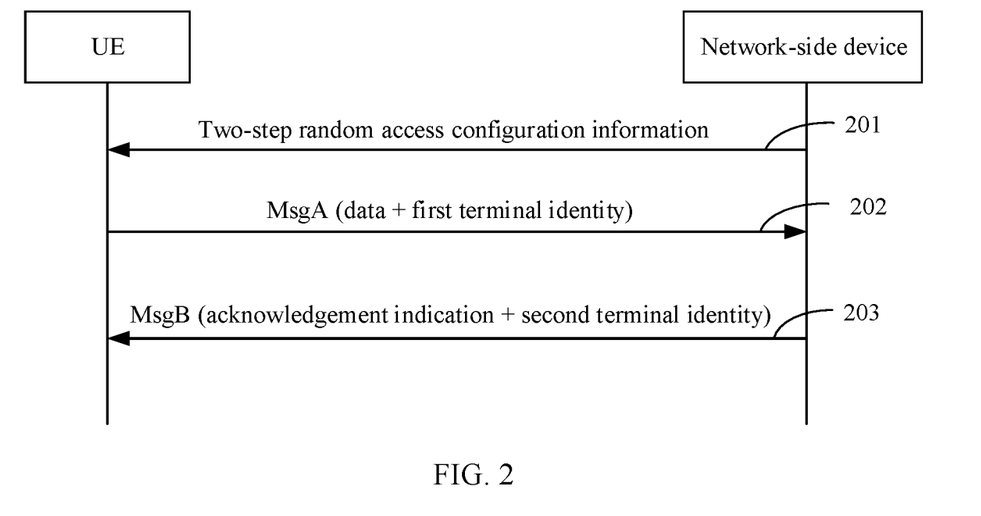
FIG. 2 is a schematic diagram of a random access procedure according to an embodiment of this disclosure.

In an embodiment of this disclosure, as shown in FIG. 2, a two-step random access procedure may include the following steps.

Step 201: A network-side device configures two-step random access configuration information (2-Step RACH configuration) for UE. The configuration information may include transmission resource information corresponding to an MsgA and an MsgB.

Step 202: The UE sends an MsgA to the network-side device. In this way, a 2-step RACH procedure is triggered. The UE may send the MsgA by using a PUSCH (Physical Uplink Shared Channel).

It should be noted that in this embodiment of this disclosure, the MsgA may include a data part and a non-data part. As shown in FIG. 2, the MsgA may carry data (Data) and a first UE identity (UE-ID1).

Step 203: The network-side device sends a feedback message MsgB to the UE.

As shown in FIG. 2, the MsgB may carry a second UE identity (UE-ID2) and an acknowledgement indication (ACK Indication for short).

It should be noted that after the UE receives the MsgB, if the UE finds, by parsing the MsgB, that the second UE identity carried in the MsgB does not match the first UE identity carried in the MsgA sent by the UE, the UE may consider that reception of the MsgB fails. In this case, the UE needs to resend an MsgA, that is, reinitiates a random access procedure.

In the two-step random access procedure in this embodiment of this disclosure, the MsgA sent in step 202 is equivalent to a combination of an Msg1 and an Msg3 in a four-step random access procedure, and the MsgB sent in step 203 is equivalent to a combination of an Msg2 and an Msg4 in the four-step random access procedure. It should be understood that in an actual application, the MsgA in the two-step random access procedure may be referred to as the Msg1, and the MsgB may be referred to as the Msg2. This may be specifically determined based on an actual situation and is not limited in this embodiment of this disclosure.

The following describes a random access method in an embodiment of this disclosure.

Figure 3:
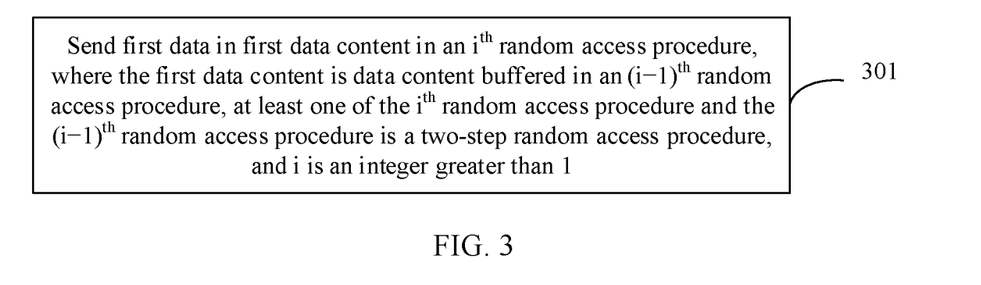
FIG. 3 is flowchart 1 of a random access method according to an embodiment of this disclosure.

FIG. 3 is a flowchart 1 of a random access method according to an embodiment of this disclosure. As shown in FIG. 3, the random access method in this embodiment includes the following steps.

Step 301: Send first data in first data content in an $i^{th}$ random access procedure.

The first data content is data content buffered in an $(i-1)^{th}$ random access procedure, at least one of the $i^{th}$ random access procedure and the $(i-1)^{th}$ random access procedure is a two-step random access procedure, and i is an integer greater than 1.

In this embodiment, at least one of the $i^{th}$ random access procedure and the $(i-1)^{th}$ random access procedure is a two-step random access procedure. In a specific implementation, this may include but is not limited to the following implementations: 1. Both the $(i-1)^{th}$ random access procedure and the $i^{th}$ random access procedure may be two-step random access procedures; 2. the $(i-1)^{th}$ random access procedure may be a two-step random access procedure and the $i^{th}$ random access procedure may be a four-step random access procedure; 3. the $(i-1)^{th}$ random access procedure may be a four-step random access procedure and the $i^{th}$ random access procedure may be a two-step random access procedure; and 4. the $(i-1)^{th}$ random access procedure may be a two-step random access procedure and the $i^{th}$ random access procedure may be a non-contention based random access procedure.

It should be noted that in this embodiment of this disclosure, in an implementation in which the $(i-1)^{th}$ random access procedure is a two-step random access procedure and the $i^{th}$ random access procedure is a four-step random access procedure, after the $(i-1)^{th}$ random access procedure fails, UE may reinitiate the four-step random access procedure and resend a message 1 in the four-step random access procedure, or switch the two-step random access procedure to the four-step random access procedure and resend a message 3 in the four-step random access procedure. This may be specifically determined based on an actual requirement and is not limited in this embodiment of this disclosure.

In addition, in this embodiment of this disclosure, the two-step random access procedure, the four-step random access procedure, and the non-contention based random access procedure are of different random access procedure types.

When the UE performs the $(i-1)^{th}$ random access procedure, the UE may buffer the first data content in the $(i-1)^{th}$ random access procedure. Therefore, on one hand, processing of data between two consecutive random access procedure attempts is normalized; on the other hand, when the $(i-1)^{th}$ random access procedure fails and the $i^{th}$ random access procedure is performed, the first data can be extracted from the buffered first data content and sent. This can reduce a data loss rate and improve reliability of data transmission.

In an actual application, in the $i^{th}$ random access procedure, the first data in the first data content may be carried in target data content and sent. The target data content may be the first data content (that is, the data content buffered in the $(i-1)^{th}$ random access procedure) or second data content (that is, data content generated in the $i^{th}$ random access procedure).

It should be noted that in this embodiment of this disclosure, the data content corresponds to a size of a data packet sent (or referred to as a transmission resource size); and in a case in which sizes of data packets sent in two random access procedures are different, data content corresponding to the sizes of the data packets sent in the two random access procedures may be different; or in a case in which sizes of data packets sent in two random access procedures are the same, data content corresponding to the sizes of the data packets sent in the two random access procedures may be the same.

The data content may be used to send a first message, where a specific representation of the first message may be determined based on a representation of the random access procedure. For example, if the random access procedure is a two-step random access procedure, the first message may be an MsgA in the two-step random access procedure; or if the random access procedure is a four-step random access procedure, the first message may be an Msg3 in the four-step random access procedure. In a specific implementation, the data content may be represented as a MAC PDU, but this is not limited. The size of the data packet sent may be determined based on uplink grant information.

Therefore, a specific representation of the target data content can be determined based on a comparison result between a size of a data packet sent in the $i^{th}$ random access procedure and a size of a data packet sent in the $(i-1)^{th}$ random access procedure.

Scenario 1: The comparison result shows a difference. To be specific, a size of a data packet sent in the $i^{th}$ random access procedure is different from a size of a data packet sent in the $(i-1)^{th}$ random access procedure.

Optionally, the sending first data in first data content includes:

in a case in which the size of the data packet sent in the $i^{th}$ random access procedure is different from the size of the data packet sent in the $(i-1)^{th}$ random access procedure, regenerating second data content including the first data, and sending the second data content.

In this scenario, because the size of the data packet sent in the $i^{th}$ random access procedure is different from the size of the data packet sent in the $(i-1)^{th}$ random access procedure, it can be known that data content corresponding to the size of the data packet sent in the $i^{th}$ random access procedure is different from data content corresponding to the size of the data packet sent in the $(i-1)^{th}$ random access procedure. Therefore, the terminal can regenerate the second data content including the first data and send the first data by using the second data content, so that a success rate of sending the first data can be increased.

It can be seen that in the scenario 1, the target data content is represented as the second data content, that is, the data content generated in the $i^{th}$ random access procedure.

In this embodiment, the transmission resource size may be represented as a TBS (Transport Block Size). Therefore, optionally, the regenerating second data content including the first data, and sending the second data content in a case in which the size of the data packet sent in the $i^{th}$ random access procedure is different from the size of the data packet sent in the $(i-1)^{th}$ random access procedure may be specifically represented as:

in a case in which a TBS used in the $i^{th}$ random access procedure is different from a TBS used in the $(i-1)^{th}$ random access procedure, regenerating the second data content including the first data, and sending the second data content.

Further, after the regenerating second data content including the first data, and before the sending the second data content, the method further includes:

buffering the second data content.

Therefore, when the $i^{th}$ random access procedure fails and the terminal reinitiates an $(i+1)^{th}$ random access procedure, the terminal can send the data included in the second data content. This can reduce the data loss rate and improve reliability of data transmission.

In a specific implementation, the terminal buffers the second data content in a buffer corresponding to the $i^{th}$ random access procedure, and buffers the first data content in a buffer corresponding to the $(i-1)^{th}$ random access procedure. However, in an actual application, the buffer corresponding to the $i^{th}$ random access procedure may be the same as or different from the buffer corresponding to the $(i-1)^{th}$ random access procedure. Therefore, the buffer of the second data content may be the same as or different from the buffer of the first data content.

Optionally, the buffer of the second data content is the same as or different from the buffer of the first data content.

Specifically, in a case in which the $i^{th}$ random access procedure and the $(i-1)^{th}$ random access procedure are of a same random access procedure type, the buffer corresponding to the $i^{th}$ random access procedure is the same as the buffer corresponding to the $(i-1)^{th}$ random access procedure, and the buffer of the second data content is the same as the buffer of the first data content. For example, if both the $i^{th}$ random access procedure and the $(i-1)^{th}$ random access procedure are two-step random access procedures, the second data content may be stored in a buffer corresponding to a two-step random access procedure: a first RACH buffer or an MsgA buffer.

In a case in which the $i^{th}$ random access procedure and the $(i-1)^{th}$ random access procedure are of different random access procedure types, but a random access procedure type of the $i^{th}$ random access procedure and that of the $(i-1)^{th}$ random access procedure use a same buffer to store data content, the buffer corresponding to the $i^{th}$ random access procedure is the same as the buffer corresponding to the $(i-1)^{th}$ random access procedure, and the buffer of the second data content is the same as the buffer of the first data content. For example, if one of the $i^{th}$ random access procedure and the $(i-1)^{th}$ random access procedure is a two-step random access procedure, and the other one is a four-step random access procedure, but the two-step random access procedure and the four-step random access procedure use a same buffer (for example, a second RACH buffer) to store data content, the second data content may be buffered in the same buffer corresponding to the two-step random access procedure and the four-step random access procedure.

In a case in which the $i^{th}$ random access procedure and the $(i-1)^{th}$ random access procedure are of different random access procedure types, and a random access procedure type of the $i^{th}$ random access procedure and that of the $(i-1)^{th}$ random access procedure use different buffers to store data content, the buffer corresponding to the $i^{th}$ random access procedure is different from the buffer corresponding to the $(i-1)^{th}$ random access procedure, and the buffer of the second data content is different from the buffer of the first data content. For example, if the $i^{th}$ random access procedure is a two-step random access procedure, but the $(i-1)^{th}$ random access procedure is a four-step random access procedure, and a buffer corresponding to the two-step random access procedure is an MsgA buffer, and a buffer corresponding to the four-step random access procedure is an Msg3 buffer, the second data content may be stored in the Msg3 buffer.

In this embodiment, the UE may send the second data content in a plurality of manners. Optionally, the sending the second data content includes:

storing the second data content in a HARQ buffer, and sending the second data content by using a HARQ process; or sending the second data content by using a layer below a protocol layer corresponding to the second data content.

In a specific implementation, in a case in which the $i^{th}$ random access procedure is a two-step random access procedure, if the two-step random access procedure supports the HARQ (Hybrid Automatic Repeat Request) process, the second data content may be stored in the HARQ buffer and sent by using the HARQ process; or if the two-step random access procedure does not support the HARQ process, the second data content may be sent to the layer below the protocol layer corresponding to the second data content, and the second data content is sent by using the lower layer. For example, if the data content is represented as a MAC PDU, the protocol layer corresponding to the second data content is a MAC layer, and the second data content is sent by using a physical layer.

In a case in which the $i^{th}$ random access procedure is a four-step random access procedure or a non-contention based random access procedure, the second data content may be stored in the HARQ buffer and sent by using the HARQ process.

Scenario 2: The comparison result shows no difference. To be specific, a size of a data packet sent in the $i^{th}$ random access procedure is the same as a size of a data packet sent in the $(i-1)^{th}$ random access procedure.

Optionally, the sending first data in first data content includes:

in a case in which the size of the data packet sent in the $i^{th}$ random access procedure is the same as the size of the data packet sent in the $(i-1)^{th}$ random access procedure, obtaining the first data content from a buffer of the first data content buffered in the $(i-1)^{th}$ random access procedure, and sending the first data content.

In this scenario, because the size of the data packet sent in the $i^{th}$ random access procedure is the same as the size of the data packet sent in the $(i-1)^{th}$ random access procedure, it can be known that data content corresponding to the size of the data packet sent in the $i^{th}$ random access procedure is the same as data content corresponding to the size of the data packet sent in the $(i-1)^{th}$ random access procedure. Therefore, the terminal can directly obtain the first data content from the buffer of the first data content buffered in the $(i-1)^{th}$ random access procedure, and send the first data content. Therefore, in comparison with the scenario 1, the first data can be directly sent by using the first data content, and there is no need to generate the second data content. Therefore, operations can be simplified.

It can be seen that in the scenario 2, the target data content is represented as the first data content, that is, the data content buffered in the $(i-1)^{th}$ random access procedure.

Similarly to the scenario 1, in the scenario 2, the obtaining the first data content from a buffer of the first data content buffered in the $(i-1)^{th}$ random access procedure, and sending the first data content in a case in which the size of the data packet sent in the $i^{th}$ random access procedure is the same as the size of the data packet sent in the $(i-1)^{th}$ random access procedure may be specifically represented as:

in a case in which a TBS used in the $i^{th}$ random access procedure is the same as a TBS used in the $(i-1)^{th}$ random access procedure, obtaining the first data content from the buffer of the first data content buffered in the $(i-1)^{th}$ random access procedure, and sending the first data content.

It should be noted that in the scenario 1, after the UE obtains the first data content from the buffer of the first data content buffered in the $(i-1)^{th}$ random access procedure, the UE may store the first data content in a buffer corresponding to the $i^{th}$ random access procedure. Therefore, when the $i^{th}$ random access procedure fails and the terminal reinitiates an $(i+1)^{th}$ random access procedure, the terminal can send the data included in the first data content that is buffered. This can reduce the data loss rate and improve reliability of data transmission.

It should be understood that the buffer of the first data content stored in the $i^{th}$ random access procedure may be the same as or different from the buffer of the first data content stored in the $(i-1)^{th}$ random access procedure. For details, refer to related descriptions in the scenario 1. Details are not described again herein.

In addition, a manner of sending the first data content by the UE in the scenario 2 is the same as a manner of sending the second data content by the UE in the scenario 1. For details, refer to related descriptions in the scenario 1. Details are not described again herein.

It should be noted that various optional implementations described in this embodiment may be implemented in combination or may be implemented independently. This is not limited in this embodiment of this disclosure.

For ease of understanding, the following descriptions are provided with reference to various implementations.

Implementation 1: Both the $(i-1)^{th}$ random access procedure and the $i^{th}$ random access procedure may be two-step random access procedures.

Step 0: When the UE fails to make an $(i-1)^{th}$ random access procedure attempt, the UE makes another random access procedure attempt before a maximum quantity of random access procedure attempts is reached, that is, the UE makes the $i^{th}$ random access procedure attempt.

Step 1.1: When the UE makes the $(i-1)^{th}$ random access procedure attempt, the UE sends uplink data after performing corresponding processing based on an uplink transmission resource size. A processing method of the UE includes either of the following:

(1) When a resource size for sending MsgA data by the UE is unchanged (for example, the TBS generated based on the uplink grant information is the same as a TBS previously used for sending MsgA data), the UE directly sends the MsgA data by using the previously stored first data content (for example, a MAC PDU).

(2) When a resource size for sending MsgA data by the UE is changed (for example, the TBS generated based on the uplink grant information is different from a TBS previously used for sending MsgA data, that is, increased or decreased), the UE regenerates the second data content, stores the second data content in a buffer corresponding to the two-step random access procedure (for example, an RACH buffer or an MsgA buffer), and sends the MsgA data by using the second data content.

Step 1.2: Based on whether an MsgA in the two-step random access procedure can be sent by using the HARQ process, the UE performs a processing action, including either of the following:

(1) If the MsgA in the two-step random access procedure can be sent by using the HARQ process, when the UE sends the MsgA data, after the UE obtains the target data content (the first data content or the second data content), the UE stores the target data content in the HARQ buffer, and sends the target data content by using the corresponding HARQ process.

(2) If the MsgA in the two-step random access procedure cannot be sent by using the HARQ process, when the UE sends the MsgA data, after the UE obtains the target data content, the UE sends the target data content to a layer below a protocol layer corresponding to the target data content, for data sending (for example, the MAC layer of the UE obtains the first data content from the MsgA buffer and then sends the first data content to a physical layer for data sending).

Implementation 2: The $(i-1)^{th}$ random access procedure may be a two-step random access procedure and the $i^{th}$ random access procedure may be a four-step random access procedure.

Step 0: When the UE fails to make an $(i-1)^{th}$ random access procedure attempt, the UE makes another random access procedure attempt before a maximum quantity of random access procedure attempts is reached, that is, the UE makes the $(i-1)^{th}$ random access procedure attempt.

Step 1.1: When the UE makes the $(i-1)^{th}$ random access procedure attempt, the UE sends uplink data after performing corresponding processing based on an uplink transmission resource size. A processing method of the UE includes either of the following:

(1) When a resource size for sending Msg3 data by the UE is unchanged (for example, the TBS generated based on the uplink grant information is the same as a TBS previously used for sending MsgA data), the UE directly sends the Msg3 data by using the previously stored first data content (for example, a MAC PDU).

(2) When a resource size for sending Msg3 data by the UE is changed (for example, the TBS generated based on the uplink grant information is different from a TBS previously used for sending MsgA data, that is, increased or decreased), the UE regenerates the second data content, and sends the Msg3 data by using the second data content.

In addition, in the four-step random access procedure, the UE may store the first data content buffered in the two-step random access procedure or the second data content regenerated and used for sending an Msg3, in a buffer corresponding to the four-step random access procedure (for example, an Msg3 buffer).

Alternatively, the four-step random access procedure and the two-step random access procedure use a same buffer (for example, an RACH buffer) to store the data for uplink transmission in the random access procedure (for example, an MsgA in the 2-step RACH or an Msg3 in the 4-step RACH).

Step 1.2: When sending the Msg3 data in the four-step random access procedure, after the UE obtains the target data content, the UE stores the target data content in the HARQ buffer, and sends the target data content by using the corresponding HARQ process.

Implementation 3: The $(i-1)^{th}$ random access procedure may be a four-step random access procedure and the $i^{th}$ random access procedure may be a two-step random access procedure.

Step 0: When the UE makes the $(i-1)^{th}$ random access procedure attempt, the UE sends uplink data after performing corresponding processing based on an uplink transmission resource size. A processing method of the UE includes either of the following:

(1) When a resource size for sending MsgA data by the UE is unchanged (for example, the TBS generated based on the uplink grant information is the same as a TBS previously used for sending Msg3 data), the UE directly sends the Msg3 data by using the previously stored first data content (for example, a MAC PDU).

(2) When a resource size for sending MsgA data by the UE is changed (for example, the TBS generated based on the uplink grant information is different from a TBS previously used for sending Msg3 data, that is, increased or decreased), the UE regenerates the second data content, and sends the MsgA data by using the second data content.

In addition, in the two-step random access procedure, the UE may store the first data content buffered in the four-step random access procedure or the second data content regenerated and used for sending an MsgA, in a buffer corresponding to the two-step random access procedure (for example, an MsgA buffer).

Alternatively, the four-step random access procedure and the two-step random access procedure use a same buffer (for example, an RACH buffer) to store the data for uplink transmission in the random access procedure (for example, an MsgA in the 2-step RACH or an Msg3 in the 4-step RACH).

Step 1.2: The UE performs a processing action, which is the same as the processing action of the UE in Implementation 1 and is not described again herein.

Implementation 4: The $(i-1)^{th}$ random access procedure may be a two-step random access procedure and the $i^{th}$ random access procedure may be a non-contention based random access procedure.

Step 0: When the UE fails to make an $(i-1)^{th}$ random access procedure attempt, the UE makes another random access procedure attempt before a maximum quantity of random access procedure attempts is reached, that is, the UE makes the $(i-1)^{th}$ random access procedure attempt.

Step 1.1: When the UE makes the $(i-1)^{th}$ random access procedure attempt, the UE sends uplink data after performing corresponding processing based on an uplink transmission resource size. A processing method of the UE includes either of the following:

(1) If a size of the resource designated for sending data specified in an Msg2 is unchanged (for example, the TBS generated based on the uplink grant information is the same as a TBS previously used for sending MsgA data) after the UE performs the non-contention based random access procedure, the UE directly sends the data by using the previously stored first data content (for example, a MAC PDU).

(2) If a size of the resource designated for sending data specified in an Msg2 is changed (for example, the TBS generated based on the uplink grant information is different from a TBS previously used for sending MsgA data, that is, increased or decreased) after the UE performs the non-contention based random access procedure, the UE regenerates the second data content, and sends the data by using the second data content.

Step 1.2: After obtaining the target data content, the UE stores the target data content in the HARQ buffer, and sends the target data content by using the corresponding HARQ process.

An embodiment of this disclosure further provides a random access method for determining a processing action of UE for data content generated in a two-step random access procedure.

Figure 4:
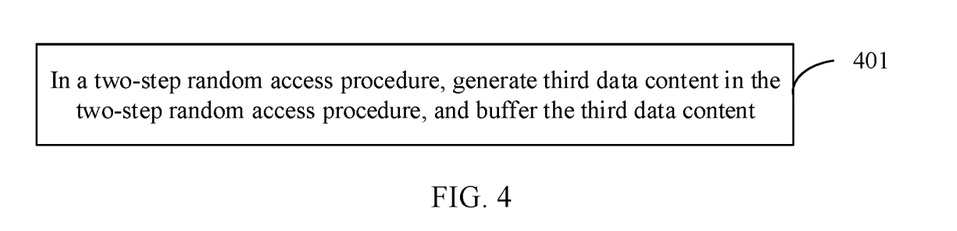
FIG. 4 is flowchart 2 of a random access method according to an embodiment of this disclosure.

FIG. 4 is a flowchart 2 of a random access method according to an embodiment of this disclosure. As shown in FIG. 4, the random access method in this embodiment may include the following step.

Step 401: In a two-step random access procedure, generate third data content in the two-step random access procedure, and buffer the third data content.

In this embodiment, the two-step random access procedure may be an $N^{th}$ random access procedure, where N is a positive integer. When N is equal to 1, the two-step random access procedure is a first random access procedure attempt.

In a specific implementation, UE stores the third data content in a buffer corresponding to the two-step random access procedure, for example, an Msg3 buffer or an RACH buffer.

Therefore, when the two-step random access procedure fails and the terminal reinitiates an $(N+1)^{th}$ random access procedure attempt, the terminal can send data included in the third data content. This can reduce a data loss rate and improve reliability of data transmission.

Optionally, after the buffering the third data content, the method further includes:

storing the third data content in a HARQ buffer, and sending the third data content by using a HARQ process; or sending the third data content by using a layer below a protocol layer corresponding to the third data content.

A manner of controlling sending of the third data content by the UE is the same as a manner of controlling sending of the second data content by the UE in the scenario 1 in the method embodiment corresponding to FIG. 3. For details, refer to descriptions of related content in the method embodiment corresponding to FIG. 3. Details are not described again herein.

It should be noted that various optional implementations described in this embodiment may be implemented in combination or may be implemented independently. This is not limited in this embodiment of this disclosure.

For ease of understanding, in the following description, it is assumed that the two-step random access procedure is the first random access procedure attempt.

Step 0: A network-side device configures two-step random access configuration information, for example, transmission resource information corresponding an Msg1 and an Msg2, for the UE.

Step 1.1: The UE triggers the two-step random access procedure, and sends the Msg1 to the network-side device, for example, sends the Msg1 by using a PUSCH.

When performing the two-step random access procedure for the first time, the UE generates the third data content (for example, a MAC PDU) to be used in the two-step random access procedure, and stores the third data content in a buffer corresponding to the two-step random access procedure (for example, an RACH buffer or an MsgA buffer).

Step 1.2: Based on whether an MsgA in the two-step random access procedure can be sent by using the HARQ process, the UE performs a processing action, including either of the following:

(1) If the MsgA in the two-step random access procedure can be sent by using the HARQ process, when the UE sends MsgA data, after the UE obtains target data content (first data content or second data content), the UE stores the target data content in the HARQ buffer, and sends the target data content by using the corresponding HARQ process.

(2) If the MsgA in the two-step random access procedure cannot be sent by using the HARQ process, when the UE sends MsgA data, after the UE obtains target data content, the UE sends the target data content to a layer below a protocol layer corresponding to the target data content, for data sending (for example, a MAC layer of the UE obtains first data content from the MsgA buffer and then sends the first data content to a physical layer for data sending).

Figure 5:
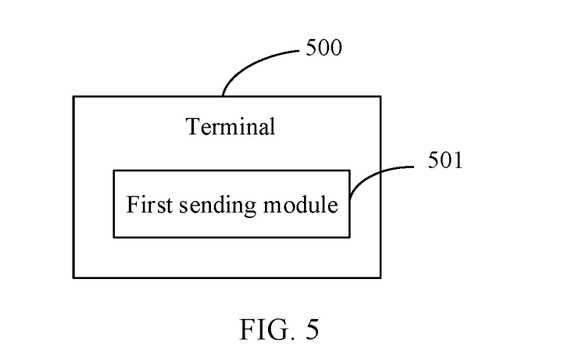
FIG. 5 is structural diagram 1 of a terminal according to an embodiment of this disclosure.

FIG. 5 is a structural diagram 1 of a terminal according to an embodiment of this disclosure. As shown in FIG. 5, the terminal 500 includes:

a first sending module 501, configured to send first data in first data content in an $i^{th}$ random access procedure, where the first data content is data content buffered in an $(i-1)^{th}$ random access procedure, at least one of the $i^{th}$ random access procedure and the $(i-1)^{th}$ random access procedure is a two-step random access procedure, and i is an integer greater than 1.

Optionally, the first sending module 501 is specifically configured to:

in a case in which a size of a data packet sent in the $i^{th}$ random access procedure is the same as a size of a data packet sent in the $(i-1)^{th}$ random access procedure, obtain the first data content from a buffer of the first data content buffered in the $(i-1)^{th}$ random access procedure, and send the first data content.

Optionally, the first sending module 501 is specifically configured to:

in a case in which a size of a data packet sent in the $i^{th}$ random access procedure is different from a size of a data packet sent in the $(i-1)^{th}$ random access procedure, regenerate second data content including the first data, and send the second data content.

Optionally, the terminal 500 further includes:

a buffer module, configured to buffer the second data content after the second data content including the first data is regenerated and before the second data content is sent.

Optionally, a buffer of the second data content is the same as or different from a buffer of the first data content.

Optionally, the first sending module 501 is specifically configured to:

in the case in which the size of the data packet sent in the $i^{th}$ random access procedure is different from the size of the data packet sent in the $(i-1)^{th}$ random access procedure, regenerate the second data content including the first data, store the second data content in a HARQ buffer, and send the second data content by using a HARQ process; or send the second data content by using a layer below a protocol layer corresponding to the second data content.

It should be noted that in this embodiment of this disclosure, the method embodiment corresponding to FIG. 3 and the method embodiment corresponding FIG. 4 may be implemented independently or may be implemented in combination. This is not limited in this embodiment of this disclosure.

The terminal 500 can implement the processes of the method embodiment corresponding to FIG. 3 in this disclosure, with the same beneficial effects achieved. To avoid repetition, details are not described again herein.

Figure 6:
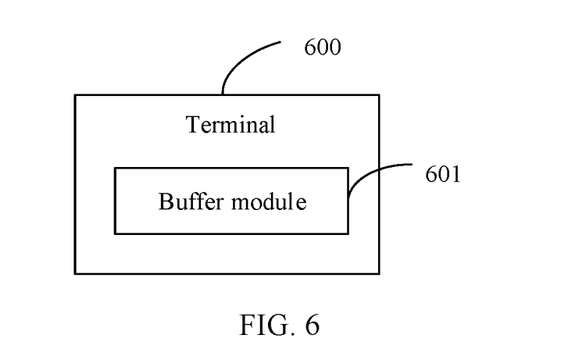
FIG. 6 is structural diagram 2 of a terminal according to an embodiment of this disclosure.

FIG. 6 is a structural diagram 2 of a terminal according to an embodiment of this disclosure. As shown in FIG. 6, the terminal 600 includes:

a buffer module 601, configured to: in a two-step random access procedure, generate third data content in the two-step random access procedure, and buffer the third data content.

Optionally, the terminal 600 further includes:

a second sending module, configured to: after the third data content is buffered, store the third data content in a HARQ buffer, and send the third data content by using a HARQ process; or send the third data content by using a layer below a protocol layer corresponding to the third data content.

The terminal 600 can implement the processes of the method embodiment corresponding to FIG. 4 in this disclosure, with the same beneficial effects achieved. To avoid repetition, details are not described again herein.

Figure 7:
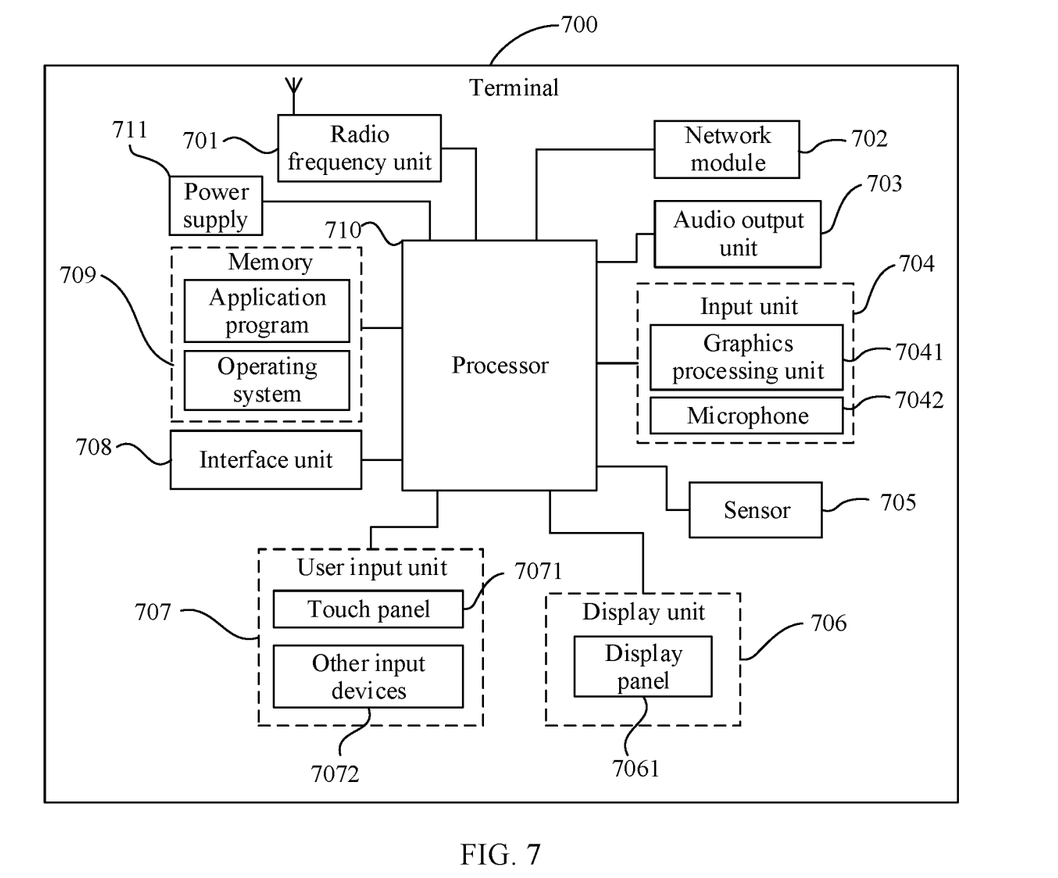
FIG. 7 is structural diagram 3 of a terminal according to an embodiment of this disclosure.

FIG. 7 is a structural diagram 3 of a terminal according to an embodiment of this disclosure. The terminal can implement various embodiments of this disclosure. As shown in FIG. 7, the terminal 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art may understand that the structure of the terminal shown in FIG. 7 does not constitute a limitation on the terminal. A quantity of components included in the terminal may be greater or less than that shown in the figure, or some components are combined, or component arrangements are different. In this embodiment of this disclosure, the terminal includes but is not limited to a mobile phone, a tablet computer, a notebook computer, a palmtop computer, a vehicle-mounted terminal, a wearable device, a pedometer, or the like.

When the terminal 700 is a terminal that can implement the processes of the method embodiment corresponding to FIG. 3 in this disclosure and achieve the same beneficial effect, the radio frequency unit 701 is configured to:

send first data in first data content in an $i^{th}$ random access procedure, where the first data content is data content buffered in an $(i-1)^{th}$ random access procedure, at least one of the $i^{th}$ random access procedure and the $(i-1)^{th}$ random access procedure is a two-step random access procedure, and i is an integer greater than 1.

Optionally, the radio frequency unit 701 is further configured to:

in a case in which a size of a data packet sent in the $i^{th}$ random access procedure is the same as a size of a data packet sent in the $(i-1)^{th}$ random access procedure, obtain the first data content from a buffer of the first data content buffered in the $(i-1)^{th}$ random access procedure, and send the first data content.

Optionally, the radio frequency unit 701 is further configured to:

in a case in which a size of a data packet sent in the $i^{th}$ random access procedure is different from a size of a data packet sent in the $(i-1)^{th}$ random access procedure, regenerate second data content including the first data, and send the second data content.

Optionally, the processor 710 is configured to:

buffer the second data content after the second data content including the first data is regenerated and before the second data content is sent.

Optionally, a buffer of the second data content is the same as or different from a buffer of the first data content.

Optionally, the radio frequency unit 701 is further configured to:

store the second data content in a HARQ buffer, and send the second data content by using a HARQ process; or send the second data content by using a layer below a protocol layer corresponding to the second data content.

When the terminal 700 is a terminal that can implement the processes of the method embodiment corresponding to FIG. 4 in this disclosure and achieve the same beneficial effect, the processor 710 is configured to:

in a two-step random access procedure, generate third data content in the two-step random access procedure, and buffer the third data content.

Optionally, the radio frequency unit 701 is configured to:

store the third data content in a HARQ buffer, and send the third data content by using a HARQ process; or send the third data content by using a layer below a protocol layer corresponding to the third data content.

It should be understood that in this embodiment of this disclosure, the radio frequency unit 701 may be configured to receive and send signals in an information reception or transmission or call process. Specifically, after receiving downlink data from a base station, the radio frequency unit 701 sends the downlink data to the processor 710 for processing, and in addition, sends uplink data to the base station. Generally, the radio frequency unit 701 includes but is not limited to an antenna, at least one amplifier, a transceiver, a coupler, a low noise amplifier, a duplexer, and the like. In addition, the radio frequency unit 701 may further communicate with a network and another device through a wireless communications system.

The terminal provides wireless broadband Internet access for a user by using the network module 702, for example, helps the user send and receive e-mails, browse web pages, and access streaming media.

The audio output unit 703 may convert audio data received by the radio frequency unit 701 or the network module 702 or stored in the memory 709 into an audio signal, and output the audio signal as a sound. In addition, the audio output unit 703 may further provide an audio output (for example, a call signal reception sound or a message reception sound) related to a specific function performed by the terminal 700. The audio output unit 703 includes a speaker, a buzzer, a telephone receiver, and the like.

The input unit 704 is configured to receive an audio or video signal. The input unit 704 may include a graphics processing unit (GPU) 7041 and a microphone 7042. The graphics processing unit 7041 processes image data of a still picture or a video obtained by an image capture apparatus (for example, a camera) in an image capture mode or a video capture mode. A processed image frame may be displayed on the display unit 706. An image frame processed by the graphics processing unit 7041 may be stored in the memory 709 (or another storage medium) or sent by the radio frequency unit 701 or the network module 702. The microphone 7042 can receive a sound and can process the sound into audio data. The processed audio data can be converted in a telephone call mode into a format that can be sent to a mobile communication base station through the radio frequency unit 701, for outputting.

The terminal 700 further includes at least one sensor 705, for example, an optical sensor, a motion sensor, and another sensor. Specifically, the optical sensor includes an ambient light sensor and a proximity sensor. The ambient light sensor may adjust luminance of a display panel 7061 based on brightness of ambient light. The proximity sensor may turn off the display panel 7061 and/or backlight when the terminal 700 moves to an ear. As a type of motion sensor, an accelerometer sensor can detect magnitudes of accelerations in all directions (usually three axes), can detect a magnitude and a direction of gravity when the terminal is in a stationary state, and can be applied to terminal posture recognition (such as screen switching between portrait and landscape, related games, and magnetometer posture calibration), functions related to vibration recognition (such as pedometer and tapping), and the like. The sensor 705 may further include a fingerprint sensor, a pressure sensor, an iris sensor, a molecular sensor, a gyroscope, a barometer, a hygrometer, a thermometer, an infrared sensor, and the like. Details are not described herein.

The display unit 706 is configured to display information input by the user or information provided for the user. The display unit 706 may include the display panel 7061. The display panel 7061 may be configured in a form of a liquid crystal display (LCD), an organic light-emitting diode (OLED), or the like.

The user input unit 707 may be configured to receive input digit or character information, and generate a key signal input related to a user setting and function control of the terminal. Specifically, the user input unit 707 includes a touch panel 7071 and other input devices 7072. The touch panel 7071, also referred to as a touchscreen, may capture a touch operation performed by the user on or near the touch panel (for example, an operation performed by the user on the touch panel 7071 or near the touch panel 7071 by using any appropriate object or accessory such as a finger or a stylus). The touch panel 7071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 710, and receives and executes a command sent by the processor 710. In addition, the touch panel 7071 may be implemented in a plurality of forms, for example, a resistive, capacitive, infrared, or surface acoustic wave touch panel. The user input unit 707 may further include the other input devices 7072 in addition to the touch panel 7071. Specifically, the other input devices 7072 may include but are not limited to a physical keyboard, a function key (such as a volume control key or a power on/off key), a trackball, a mouse, a joystick, and the like. Details are not described herein.

Further, the touch panel 7071 may cover the display panel 7061. After the touch panel 7071 detects a touch operation on or near the touch panel, the touch panel 7071 transmits the touch operation to the processor 710 to determine a type of a touch event. Then the processor 710 provides a corresponding visual output on the display panel 7061 based on the type of the touch event. Although the touch panel 7071 and the display panel 7061 are used as two independent components to implement input and output functions of the terminal in FIG. 7, the touch panel 7071 and the display panel 7061 may be integrated to implement the input and output functions of the terminal in some embodiments. This is not specifically limited herein.

The interface unit 708 is an interface for connecting an external apparatus to the terminal 700. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 708 may be configured to receive an input (for example, data information or power) from an external apparatus, and transmit the received input to one or more components in the terminal 700, or may be configured to transmit data between the terminal 700 and an external apparatus.

The memory 709 may be configured to store a software program and various data. The memory 709 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 709 may include a high-speed random access memory, or may further include a non-volatile memory, for example, at least one magnetic disk storage device, a flash memory, or another volatile solid-state storage device.

The processor 710 is a control center of the terminal. The processor 710 uses various interfaces and lines to connect all parts of the entire terminal, and performs various functions and data processing of the terminal by running or executing the software program and/or module stored in the memory 709 and invoking data stored in the memory 709, thereby performing overall monitoring on the terminal. The processor 710 may include one or more processing units. Preferably, the processor 710 may integrate an application processor and a modem processor. The application processor mainly processes the operating system, a user interface, an application program, and the like. The modem processor mainly processes wireless communication. It may be understood that the modem processor may alternatively not be integrated into the processor 710.

The terminal 700 may further include the power supply 711 (such as a battery) supplying power to each component. Preferably, the power supply 711 may be logically connected to the processor 710 by using a power management system, so that functions such as charge and discharge management and power consumption management are implemented by using the power management system.

In addition, the terminal 700 includes some functional modules that are not illustrated. Details are not described herein.

Preferably, an embodiment of this disclosure further provides a terminal, including a processor 710, a memory 709, and a computer program stored in the memory 709 and capable of running on the processor 710. When the computer program is executed by the processor 710, the processes of the foregoing random access method embodiment are implemented, with the same technical effect achieved. To avoid repetition, details are not described again herein.

An embodiment of this disclosure further provides a computer readable storage medium, where a computer program is stored in the computer readable storage medium. When the computer program is executed by a processor, the processes of the foregoing random access method embodiment are implemented, with the same technical effect achieved. To avoid repetition, details are not described again herein. The computer-readable storage medium is, for example, a read-only memory (ROM for short), a random access memory (RAM for short), a magnetic disk, or an optical disc.

It should be noted that the terms "comprise", "include", or any of their variants in this specification are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing implementations, a person skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the embodiments. The embodiments are only illustrative rather than restrictive. Inspired by this disclosure, a person of ordinary skill in the art can still derive a plurality of variations without departing from the essence of this disclosure and the protection scope of the claims. All these variations shall fall within the protection of this disclosure.

What is claimed is:

1. A random access method, applied to a terminal and comprising:

in a case that an $(i-1)^{th}$ random access procedure which is a two-step random access procedure fails, continuing to obtain first data content which is data content buffered in an MsgA buffer in the $(i-1)^{th}$ random access procedure;

sending first data in the first data content in an $i^{th}$ random access procedure, wherein i is an integer greater than 1;

wherein the sending the first data in the first data content, comprises:

in a case in which the $i^{th}$ random access procedure is a two-step random access procedure, obtaining the first data content from the MsgA buffer and sending the first data content; or, in a case in which the $i^{th}$ random access procedure is a four-step random access procedure, obtaining the first data content from the MsgA buffer and sending the first data content, and buffering the first data content in an Msg3 buffer.

2. The method according to claim 1, wherein the sending first data in the first data content comprises:

in a case in which a size of a data packet sent in the $i^{th}$ random access procedure is different from a size of a data packet sent in the $(i-1)^{th}$ random access procedure, generating second data content comprising the first data, and sending the second data content.

3. The method according to claim 2, wherein after the generating second data content comprising the first data, and before the sending the second data content, the method further comprises:

buffering the second data content.

4. The method according to claim 3, wherein a buffer of the second data content is the same as or different from a buffer of the first data content.

5. The method according to claim 2, wherein the sending the second data content comprises:

storing the second data content in a Hybrid Automatic Repeat Request (HARQ) buffer, and sending the second data content by using a HARQ process; or sending the second data content by using a physical layer.

6. A terminal, comprising a processor, a memory, and a computer program stored in the memory and capable of running on the processor, wherein the computer program is executed by the processor to perform steps of:

in a case that an $(i-1)^{th}$ random access procedure which is a two-step random access procedure fails, continuing to obtain first data content which is data content buffered in an MsgA buffer in the $(i-1)^{th}$ random access procedure;

sending first data in the first data content in an $i^{th}$ random access procedure, wherein i is an integer greater than 1;

wherein when sending the first data in the first data content, the computer program is executed by the processor to perform:

in a case in which the $i^{th}$ random access procedure is a two-step random access procedure, obtaining the first data content from the MsgA buffer and sending the first data content; or, in a case in which the $i^{th}$ random access procedure is a four-step random access procedure, obtaining the first data content from the MsgA buffer and sending the first data content, and buffering the first data content in an Msg3 buffer.

7. The terminal according to claim 6, wherein the processor is configured to, in a case in which a size of a data packet sent in the $i^{th}$ random access procedure is different from a size of a data packet sent in the $(i-1)^{th}$ random access procedure, generate second data content comprising the first data, and send the second data content.

8. The terminal according to claim 7, wherein after the generating second data content comprising the first data, and before the sending the second data content, the processor is configured to, buffer the second data content.

9. The terminal according to claim 8, wherein a buffer of the second data content is the same as or different from a buffer of the first data content.

10. The terminal according to claim 7, wherein the processor is configured to, store the second data content in a Hybrid Automatic Repeat Request (HARQ) buffer, and send the second data content by using a HARQ process; or send the second data content by using a physical layer.

11. A non-transitory computer-readable storage medium, wherein the computer-readable storage medium stores a computer program, and the computer program is executed by a processor to perform steps of:

in a case that an $(i-1)^{th}$ random access procedure which is a two-step random access procedure fails, continuing to obtain first data content which is data content buffered in an MsgA buffer in the $(i-1)^{th}$ random access procedure;

sending first data in the first data content in an $i^{th}$ random access procedure, wherein i is an integer greater than 1;

wherein when sending the first data in the first data content, the computer program is executed by the processor to perform:

in a case in which the $i^{th}$ random access procedure is a two-step random access procedure, obtaining the first data content from the MsgA buffer and sending the first data content; or, in a case in which the $i^{th}$ random access procedure is a four-step random access procedure, obtaining the first data content from the MsgA buffer and sending the first data content, and buffering the first data content in an Msg3 buffer.

12. The non-transitory computer-readable storage medium according to claim 11, wherein the computer program is executed by the processor to perform steps of:

in a case in which a size of a data packet sent in the $i^{th}$ random access procedure is different from a size of a data packet sent in the $(i-1)^{th}$ random access procedure, generating second data content comprising the first data, and sending the second data content.

13. The non-transitory computer-readable storage medium according to claim 12, wherein after the generating second data content comprising the first data, and before the sending the second data content, the computer program is executed by the processor to perform steps of:

buffering the second data content.

14. The non-transitory computer-readable storage medium according to claim 13, wherein a buffer of the second data content is the same as or different from a buffer of the first data content.

15. The non-transitory computer-readable storage medium according to claim 12, wherein the computer program is executed by the processor to perform steps of:

store the second data content in a Hybrid Automatic Repeat Request (HARQ) buffer, and send the second data content by using a HARQ process; or send the second data content by using a physical layer.

* * * * *